(12) United States Patent
Unteregger et al.

(10) Patent No.: US 9,770,134 B2
(45) Date of Patent: Sep. 26, 2017

(54) APPARATUS AND METHOD FOR PROCESSING A FOOD STUFF

(75) Inventors: Johann Unteregger, Klagenfurt (AT); Christian Rosenwirth, St. Georgen/Gailtal (AT)

(73) Assignee: KONINKLIJKE PHILIPS N.V., Eindhoven (NL)

(*) Notice: Subject to any disclaimer, the term of this patent is extended or adjusted under 35 U.S.C. 154(b) by 863 days.

(21) Appl. No.: 14/239,814

(22) PCT Filed: Aug. 23, 2012

(86) PCT No.: PCT/IB2012/054265
§ 371 (c)(1),
(2), (4) Date: Feb. 20, 2014

(87) PCT Pub. No.: WO2013/030728
PCT Pub. Date: Mar. 7, 2013

(65) Prior Publication Data
US 2014/0209722 A1    Jul. 31, 2014

Related U.S. Application Data

(60) Provisional application No. 61/530,122, filed on Sep. 1, 2011.

(30) Foreign Application Priority Data

Sep. 1, 2011  (EP) .................................. 11179685

(51) Int. Cl.
*A47J 43/07*    (2006.01)
*B26D 1/28*    (2006.01)
(Continued)

(52) U.S. Cl.
CPC ........... *A47J 43/07* (2013.01); *A47J 43/0711* (2013.01); *B26D 1/28* (2013.01); *B26D 3/22* (2013.01); *B26D 7/08* (2013.01)

(58) Field of Classification Search
CPC ......... A47J 43/07; A47J 43/0711; B26D 3/22; B26D 1/28; B26D 7/08
(Continued)

(56) References Cited

U.S. PATENT DOCUMENTS 4,190,208 A    2/1980  Schaeffer et al.
4,364,525 A    12/1982 McClean
(Continued)

FOREIGN PATENT DOCUMENTS

CH       698371 B1    7/2009
DE     7934681 U1    5/1980
(Continued)

*Primary Examiner* — Mark Rosenbaum

(57) ABSTRACT

The present application relates to an apparatus for processing a food stuff. The apparatus has a housing (2), and a cutting tool (5) rotatably mounted in the housing (2) having a cutting edge (35) and a trailing edge (31). The cutting tool (5) is arranged to pass once per revolution through a processing region (43) in the housing in which a food stuff is receivable, and to pass through a recovery region (45). The recovery region is defined in the housing between the trailing edge passing from the processing region and the cutting edge passing into the processing region as the cutting tool rotates, and the cutting tool is free to rotate in the processing region without contacting the food stuff. Therefore, the cutting tool (5) acts on a food stuff as the cutting tool rotates through the processing region, and recovers the rotational speed lost due to acting on a food stuff in the processing region as the cutting tool (5) rotates through the recovery region. The present application also relates to a food processor and to a method of processing a food stuff.

13 Claims, 3 Drawing Sheets

(51) Int. Cl.
　　*B26D 3/22*　　　(2006.01)
　　*B26D 7/08*　　　(2006.01)

(58) Field of Classification Search
　　USPC .................................. 241/92, 282.1, 282.2
　　See application file for complete search history.

(56) References Cited

U.S. PATENT DOCUMENTS

| 6,401,605 | B1 | 6/2002 | Repac et al. |
| 2004/0060414 | A1 | 4/2004 | Sundqvist |
| 2004/0159727 | A1 | 8/2004 | Mueller |
| 2010/0154658 | A1 | 6/2010 | Conti et al. |
| 2011/0049279 | A1 | 3/2011 | Beber et al. |

FOREIGN PATENT DOCUMENTS

| DE | 7934682 | U1 | 5/1980 |
| DE | 3644267 | A1 | 7/1988 |
| DE | 3743916 | A1 | 7/1989 |
| DE | 4333096 | A1 | 4/1994 |
| DE | 29720191 | U1 | 1/1998 |
| DE | 19902392 | A1 | 8/2000 |
| DE | 19948168 | C1 | 1/2001 |
| DE | 10149690 | A1 | 4/2003 |
| DE | 20314245 | U1 | 11/2003 |
| DE | 20314246 | U1 | 12/2003 |
| DE | 20314247 | U1 | 12/2003 |
| DE | 202006017087 | U1 | 1/2007 |
| EP | 0100755 | A2 | 2/1984 |
| EP | 2065145 | A1 | 6/2009 |
| EP | 2130471 | A1 | 9/2009 |
| FR | 2109123 | A5 | 5/1972 |
| FR | 2144972 | A5 | 2/1973 |
| FR | 2548573 | A1 | 1/1985 |
| FR | 2565883 | A1 | 12/1985 |
| FR | 2851190 | A3 | 8/2004 |
| FR | 2865623 | A1 | 8/2005 |
| FR | 2872399 | A1 | 1/2006 |
| FR | 2887133 | A1 | 12/2006 |
| FR | 2892289 | A1 | 4/2007 |
| FR | 2919169 | A1 | 1/2009 |
| GB | 2436784 | A | 10/2007 |
| JP | 1976016939 | B | 5/1976 |
| JP | 2005153081 | A | 6/2005 |
| JP | 2006315144 | A | 11/2006 |
| SE | 620337 | C2 | 6/2003 |
| WO | 02064331 | A1 | 8/2002 |
| WO | 2005026352 | A1 | 3/2005 |
| WO | 2009093973 | A1 | 7/2009 |
| WO | 2009112364 | A1 | 9/2009 |
| WO | 2010012727 | A1 | 2/2010 |
| WO | 2010082857 | A1 | 7/2010 |

APPARATUS AND METHOD FOR PROCESSING A FOOD STUFF

CROSS-REFERENCE TO PRIOR APPLICATIONS

This application is the U.S. National Phase application under 35 U.S.C. §371 of International Application No. PCT/IB2012/054265, filed on Aug. 23, 2012, which claims the benefit of U.S. Provisional Patent Application No. 61/530,122, filed Sep. 1, 2011 and European Patent Application No. 11179685.0, filed on Sep. 1, 2011. These applications are hereby incorporated by reference herein.

FIELD OF THE INVENTION

The present invention relates to an apparatus for processing a food stuff. The present invention also relates to a food processor comprising an apparatus for processing a food stuff and a method of processing a food stuff.

BACKGROUND OF THE INVENTION

Apparatus are known for mechanically processing food stuffs. The mechanical processing of a food stuff includes the operation of slicing, chopping, cutting, dicing, mincing, shredding, crushing or grating. Such an apparatus generally forms part of a food processor for use as a domestic appliance and includes a container to which the apparatus is mounted to receive a processed food stuff, and a base unit on which the container and apparatus are removably disposed. A drive unit is disposed in the base unit to drive the apparatus.

One such apparatus for processing a food stuff is a dicing unit which cuts a food stuff into cubes. Such an apparatus generally comprises a housing with a stationary cutting die having knives arranged in a grid fixedly mounted to the housing, and a cutting tool comprising cutting blades mounted in a solid disc which is rotatably mounted in the housing and driven by the drive unit. The stationary cutting die is disposed perpendicular to the rotational axis of the cutting tool so that the or each cutting blade moves over the stationary cutting die parallel to, but spaced from, the die as the cutting tool is rotated to slice a food stuff disposed between the or each blade and the stationary die. A wedge element is mounted along the cutting blade which urges a food stuff cut by the cutting blade against and through the stationary cutting die so that the food stuff is diced.

However, one problem with the above arrangement is that the cutting tool is in constant contact with a food stuff fed into the housing as it rotates. Therefore, a large torque is required to maintain an adequate rotational speed of the cutting tool to cut the food stuff to prevent the apparatus from stopping during use.

SUMMARY OF THE INVENTION

Therefore, it is an object of the invention to provide an apparatus for processing food which substantially alleviates or overcomes the problems mentioned above.

According to the present invention, there is provided an apparatus for processing a food stuff comprising a housing, and a cutting tool rotatably mounted in the housing having a cutting edge and an trailing edge, the cutting tool being configured to pass once per revolution through a processing region in the housing in which a food stuff is receivable, and to pass through a recovery region in which the cutting tool is free to rotate without contacting the food stuff in the processing region, wherein the recovery region is defined in the housing between the trailing edge passing from the processing region and the cutting edge passing into the processing region as the cutting tool rotates, so that the cutting tool acts on a food stuff as the cutting tool rotates through the processing region, and recovers the rotational speed lost due to acting on a food stuff in the processing region as the cutting tool rotates through the recovery region.

An advantage of the above arrangement is that the torque required to maintain an adequate rotational speed to cut a food stuff is minimised. Therefore, a low powered drive unit can be used, such as a hand blender.

Conveniently, the recovery region is configured to extend about the rotational axis of the cutting tool by an angle which is sufficient for the cutting edge of the cutting tool to pass into the processing region at the same speed on each revolution of the cutting tool.

Advantageously, the cutting tool comprises a radially extending cutting element configured to rotate about the rotational axis of the cutting tool.

With this arrangement, the cutting tool is able to rotate about a large rotational angle without passing through the processing region.

The cutting tool may further comprise a mounting element at one end of the cutting element about which the cutting tool rotates.

The cutting tool may further comprise a support element, the cutting element extending from the mounting element to the support element.

Conveniently, the apparatus further comprises a circumferentially extending slot formed by the housing, wherein the support element is configured to slide along the slot as the cutting tool is rotated in the housing.

Therefore, the cutting tool is stably supported.

The housing may have first and second opposing faces between which the rotational path of the cutting tool is defined.

Conveniently, an opening is defined in the first opposing face through which a food stuff is feedable into the processing region.

With this arrangement, a means of supplying a food stuff to the processing region is easily formed.

In one embodiment, the processing region is defined between the opening in the first opposing face and the second opposing face.

Advantageously, a cutting die is received in the second opposing face.

The area of the cutting die may be configured to encompass the processing region in an axial direction.

Therefore, a food stuff fed into the processing region is urged through the cutting die without being urged into the recovery region.

According to another aspect of the invention there is provided a food processor comprising an apparatus for processing a food stuff.

The food processor may further comprise a drive unit, wherein the drive unit is a hand-blender.

Therefore, it is not necessary to provide a dedicated drive unit to drive the apparatus for processing a food stuff.

These and other aspects of the invention will be apparent from and elucidated with reference to the embodiments described hereinafter.

According to another aspect of the invention there is provided a method of processing a food stuff in an apparatus for processing a food stuff comprising a housing, and a cutting tool rotatably mounted in the housing having a cutting edge and an trailing edge, the cutting tool passing once per revolution through a processing region in the housing in which a food stuff is receivable, and passing through a recovery region in which the cutting tool is free to rotate without contacting the food stuff in the processing region, wherein the recovery region is defined in the housing between the trailing edge passing from the processing region and the cutting edge passing into the processing region as the cutting tool rotates, so that the cutting tool acts on a food stuff as the cutting tool rotates through the processing region and recovers the rotational speed lost due to acting on a food stuff in the processing region as the cutting tool rotates through the recovery region.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
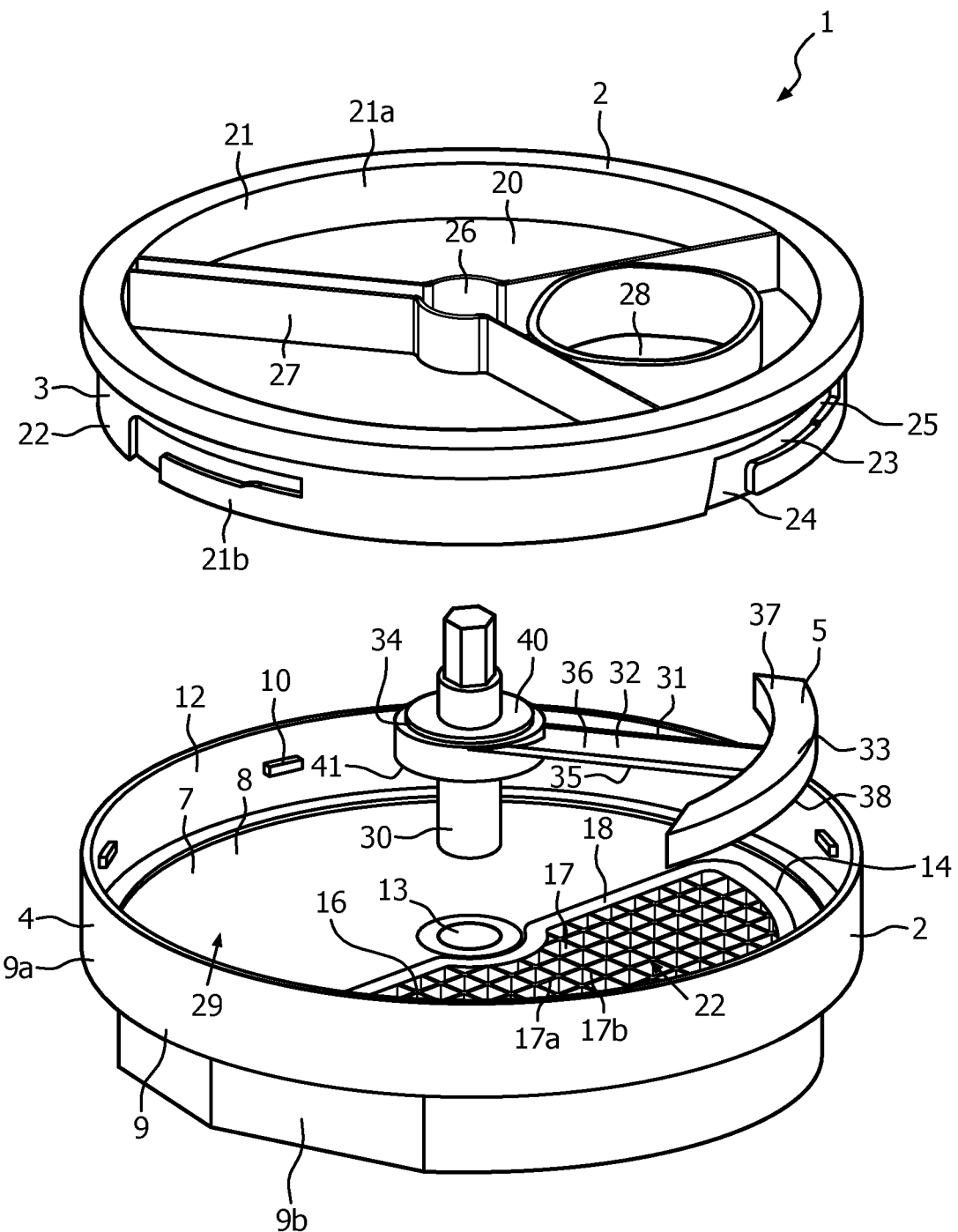
FIG. 1 shows an exploded perspective view of an apparatus for processing food.

Referring to FIG. 1, an apparatus for processing food 1 is shown. The present embodiment is arranged to dice a food stuff into cubes, however it will be appreciated that the apparatus may be configured to apply an alternative process to a food stuff, for example slicing, chopping, cutting, dicing, mincing, shredding, crushing or grating. The apparatus comprises a housing 2 having an upper part 3 and a lower part 4 and a cutting tool 5 which is rotatably mounted in the housing 2 between the upper and lower parts 3, 4.

The apparatus 1 forms part of a food processor for use as a home appliance comprising a container (not shown) for storing a food stuff that has been mechanically processed by the apparatus for processing food and a drive unit (not shown) to rotatably drive the cutting tool 5. The apparatus for processing food 1 is releasably mounted to an upper end of the container so that processed food falls into the container and the drive unit is releasably engaged with the apparatus for processing food to mechanically engage with the cutting tool to rotate the cutting tool in the housing. In the present embodiment the drive unit is a hand-held blender which is releasably mounted to drive the cutting tool 5, as will become apparent hereinafter.

The housing 2 is generally cylindrical and the upper part 3 and the lower part 4 are releasably mountable to each other by a locking mechanism. The lower part 4 has an upper face 8 formed by a circular base 7. A circumferentially extending lower part wall 9 extends around the periphery of the base 7, and has upper and lower portions 9a, 9b extending above and below the base 7. Tabs 10 protrude from an inner face 12 of the upper portion of the wall 9 which are spaced around the inner face 12. The tabs 10 form part of the housing locking mechanism and act as attachment members to attach the lower part 4 to the upper part 3, as will become apparent hereinafter.

A tubular section extends downwardly from a lower face of the lower part 4 and forms a lower bore 13 with an opening in the centre of the upper face 8.

Figure 2:
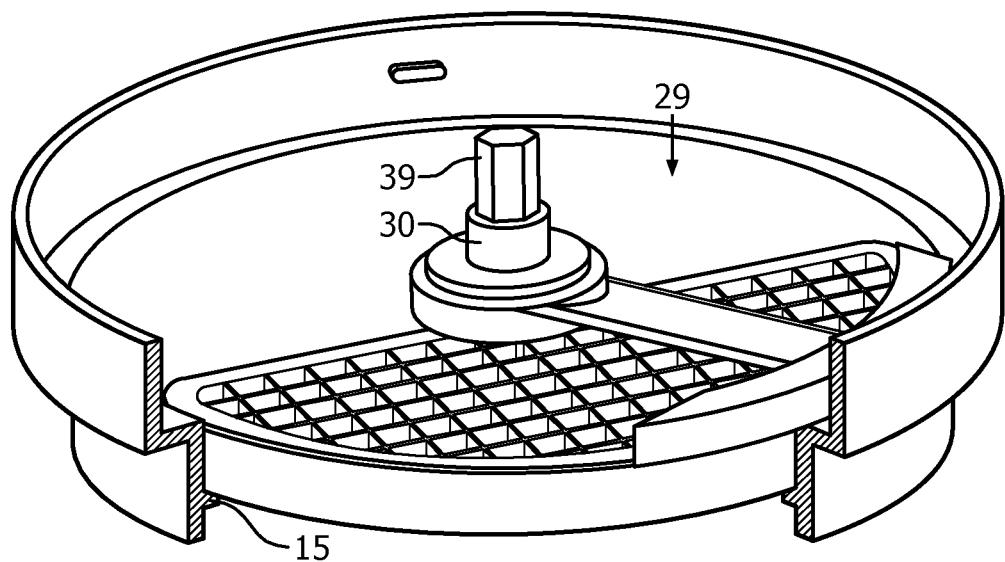
FIG. 2 shows a partial cross-sectional view of a lower housing part and a cutting tool of the apparatus for processing food shown in FIG. 1.

A die receiving aperture 14 is formed through the base 7 of the lower part 4. The aperture 14 has an inwardly facing die support flange 15 (refer to FIG. 2) extending around its periphery which is spaced from the upper face 8 to support a cutting die unit 16 which is removably received in the aperture 14.

The cutting die unit 16 comprises a grid of upstanding cutting blades 17 supported by a frame 18, with a first array of cutting blades 17a arranged to intersect a second array of cutting blades 17b at a 90 degree angle. Although the first and second array of cutting blades 17a, 17b are arranged perpendicular to each other, it will be appreciated that they may be arranged at an alternative angle to each other. The cutting die unit 16 is received in the die receiving aperture 14 and supported by the die support flange 15. The cutting die unit 16 forms a stationary cutting unit, as will become apparent hereinafter. In an alternative arrangement the cutting die unit 16 is integrally formed with the base 7 of the lower part 4.

The upper part 3 of the housing 2 has an upper and lower surfaces formed by a circular panel 20. A circumferentially extending upper part wall 21 extends around the periphery of the panel 20, and has upper and lower portions 21a, 21b extending above and below the circular panel 20.

The diameter of an outer surface 22 of the upper part wall 21 corresponds to the diameter of the inner face 12 of the lower part wall 9 so that the upper part 3 is slidably receivable in the lower part 2. Recesses 23 are formed in the outer surface 22 of the upper part wall 21. Each recess 23 forms part of the housing locking mechanism and acts as an attachment element, comprises an inlet section 24 which is open at a lower edge of the upper part wall 21, and an attachment section 25 which extends arcuately around the outer surface 22 of the upper part wall 21. The location of each recess 23 corresponds to the location of each of the tabs 10 on the lower part 4 so that the recesses and tabs align with each other, and the tabs engage in the recess to mount the upper and lower parts 3, 4 together when the container 2 and lid 3 are drawn together.

An upper bore 26 is formed in the upper part 3 with an opening in the lower surface of the upper part 3. The longitudinal axis of the upper bore 26 extends through the centre of the upper part 3 so that, when the upper and lower parts 3, 4 of the housing 2 are mounted to each other, the longitudinal axis of the upper bore 26 extends co-axially with the longitudinal axis of the lower bore 13 in the lower part 4.

Support ribs 27 extend along the upper surface of the upper part 3 to provide structural support to the upper part 3. An opening 28 is formed through the upper part 3. The opening 28 defines an inlet for feeding a food stuff into the housing 2 to a cutting tool receiving space 29 defined between the upper and lower parts 3, 4 when the housing 2 is assembled. When the housing 2 is assembled the opening 28 is aligned with and disposed above the cutting die unit 16, so that a food stuff fed into the housing 2 through the inlet is fed to the cutting die unit 16 (refer to FIG. 3).

The cutting tool 5 has a central shaft, acting as a mounting element 30, which defines a rotational axis of the cutting tool 5 and a single elongate cutting element 32 extends radially from the central mounting element 30. A support element 33 is disposed at a distal end of the cutting element 32 to the mounting element 30. The mounting element 30 has a support collar 34 extending circumferentially around its longitudinal axis.

The cutting element 32 is an elongate blade with a leading edge which forms a cutting edge 35 of the cutting tool 5. A wedge element 36 extends from the cutting element 32, away from the cutting edge 35, and has an urging face which angles downwardly away from the cutting edge 35 to apply an component of force in an axial direction to a food stuff cut by the cutting element 32 as the cutting tool 5 is rotated about its rotational axis. The cutting edge 35 forms the leading edge as the cutting tool 5 is rotated and an opposing edge of the cutting tool 5 to the cutting edge 35 forms a trailing edge 31.

In the present embodiment the wedge element 36 is integrally formed with the cutting element 32, however it will be appreciated that the configuration of the cutting tool 5 is not limited thereto and that the wedge element 36 may be a separate component.

The support element 33 is an elongate arcuate member with upper and lower support faces 37, 38. The support collar 34 is formed midway along the mounting element 30 and the mounting element has a drive unit engaging means 39 to directly or indirectly engage with a drive unit (not shown) to rotate the cutting tool 5. The support collar 34 has top and bottom support faces 40, 41.

When the housing 2 is assembled, the upper and lower parts 3, 4 of the housing are brought together and are mounted to each other by engaging the tabs 10 in the recesses 23 and rotating the upper and lower parts 3, 4 relative to each other about their central axis so that the tabs locate in the attachment section 25 of the recesses 23.

A circumferentially extending slot (not shown) extends around the periphery of the cutting tool receiving space 29 between opposing outer sections of the upper face 8 of the lower part 4 and the lower surface of the upper part 3. The slot is arranged to slidably receive the support element 33 of the cutting tool 5, and forms plain bearing surfaces along which the support element 33 of the cutting tool 5 is able to slide, but prevents the support element from moving in an axial direction. Similarly, opposing collar guide surfaces are defined around the openings to the upper and lower bores 13, 26 which form plain bearing surfaces along which the support collar 34 of the cutting tool 5 is able to slide, but prevents the support collar from moving in an axial direction.

Figure 3:
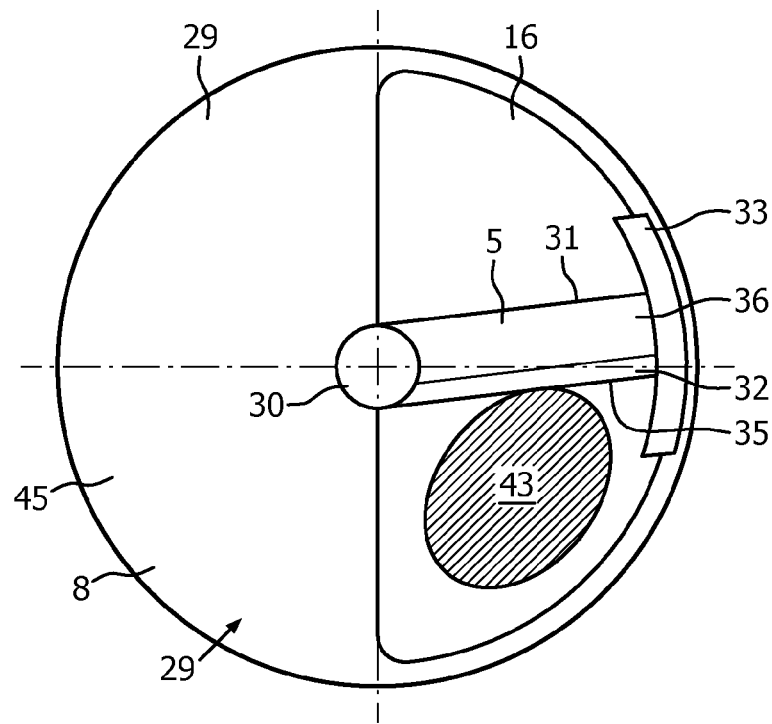
FIG. 3 shows a diagrammatic plan view of a lower housing part and a cutting tool of the apparatus for processing food shown in FIG. 1 with a cutting edge of the cutting tool passing into a processing region.
Figure 4:
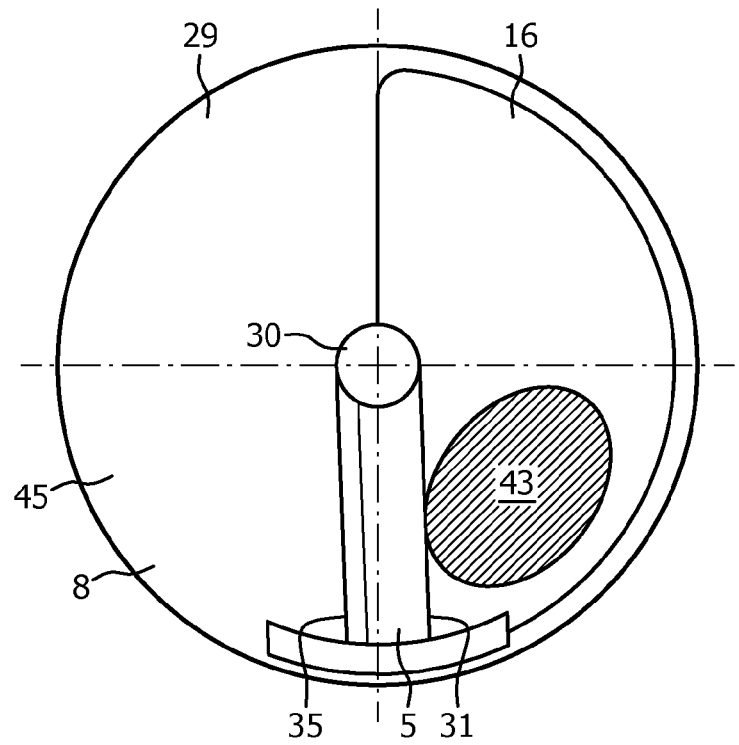
FIG. 4 shows a diagrammatic plan view of a lower housing part and a cutting tool of the apparatus for processing food shown in FIG. 1 with a trailing edge of the cutting tool passing from a processing region.

Referring to FIGS. 3 and 4, a processing region 43 is defined in the cutting tool receiving space 29. The processing region 43 is defined as a space in the cutting tool receiving space 29 in which an unprocessed food stuff fed into the housing 2 is received. In the present embodiment, the processing region 43 is defined by the projected volume in an axial direction below the opening 28 in the upper part 3, and extending to the cutting die unit 16. The extent of the processing region 43 is substantially determined by the periphery of the opening 28, however it will be appreciated that food stuff may disperse slightly outside the periphery of the opening 28.

It will be appreciated that the area of the projected volume of the processing region 43 in an axial direction is encompassed by the area of the cutting die unit 16, so that a food stuff in the processing region is urged against and through the cutting die unit 16 by the rotating cutting tool 5. Furthermore, it will be appreciated that the area of the processing region in an axial direction is smaller than the area of the cutting die unit 16.

A recovery region 45 is also defined in the cutting tool receiving space 29. The recovery region 45 is defined as the section of the path of the cutting tool 5 as it is rotated about the cutting tool receiving space 29 between the trailing edge 31 of the cutting tool 5 passing from the processing region 43 (as shown in FIG. 4) and the cutting edge 35 of the cutting tool 5 passing into the processing region 43 (as shown in FIG. 3). As the trailing edge 31 of the cutting tool 5 passes from the processing region 43, it is no longer in contact with an unprocessed food stuff fed into the processing region 43, and so the cutting tool 5 is not restricted from moving due to the action of the unprocessed foodstuff and is free to rotate in the cutting tool receiving space 29. As the cutting edge 35 of the cutting tool 5 passes into the processing region 43, it contacts an unprocessed food stuff fed into the processing region 43 which resists rotation of the cutting tool 5.

It will be appreciated that the size of the recovery region is determined by the size of the processing region. In the present embodiment, the recovery region 45 has an angle of approximately 270 degrees between the trailing edge 31 passing from the processing region 43 and the cutting edge 35 passing into the processing region 43 as the cutting tool 5 rotates.

Operation of the apparatus will now be described with reference to the drawings. The cutting tool 5 is inserted into the cutting tool receiving space 29 and the shaft, acting as a mounting element 30, is received in the lower bore 13 of the lower part 4. The shaft is free to rotate in the lower bore 13 and so the cutting tool 5 is able to freely rotate about the lower part 4 of the housing 2. The upper part 3 of the housing 2 is then brought towards the lower part 4 and is mounted thereto by the tabs 10 being engaged in the recesses 23 as part of the upper part 3 overlaps the lower part 4 and is rotated relative thereto about the rotational axis.

As the upper part 3 is brought together with the lower part 4, the shaft, acting as a mounting element 30, is received in the upper bore 26 and the support element 33 is received in the circumferentially extending slot defined between the upper and lower parts 3, 4.

When the housing 2 is assembled, the cutting tool 5 is free to rotate about its rotational axis in the cutting tool receiving space 29. The cutting element 44 extends radially outwardly from the rotational axis of the cutting tool 5. Furthermore, the opening 28 defining an inlet for feeding a food stuff into the housing is disposed above the cutting die unit 16 and the processing region 29 of the cutting tool receiving space 29 is defined between the opening 28 and the cutting die unit 16.

A drive unit (not shown) is then engaged with the drive unit engaging means 39 and is operated to rotate the cutting tool 5 in the cutting tool receiving space 29 of the housing 2. The cutting tool 5 rotates in the cutting tool receiving space 29 and passes through the processing region 43 once per revolution. The cutting tool 5 is guided and supported in the housing 2 by the support collar 46 sliding between the upper face 8 of the lower part 4 and the lower surface of the upper part 3, and the support element 33 sliding in the circumferentially extending slot.

An unprocessed food stuff is then fed into the housing 2 through the opening 28 and is received in the processing region 43. The cutting tool 5 rotates in the cutting tool receiving space 29 and follows a path around the rotational axis. As the cutting edge 35 of the cutting tool 5 passes into the processing region 43, the cutting tool 5 contacts the unprocessed food stuff received in the processing region 43. A resistive force acts on the cutting tool 5 due to the action of the cutting element 32 cutting the food stuff as it rotates through the processing region 43, and the wedge element 36 acts on the cut food stuff to urge it against and through the cutting die unit 16 to complete the cubing operation of the apparatus. Therefore, the path of the cutting tool 5 is restricted by the food stuff as it passes through the processing region 43 and the rotational speed of the cutting tool 5 reduces due to the load on the cutting tool as the hand blender acting as a drive unit has a limited torque.

The cutting edge 35 of the cutting tool 5 is offset from the radial line of the cutting tool 5 extending from the mounting element 30 due to the width of the cutting tool 5. Therefore, the cutting tool 5 also provides a slicing action on the food stuff 5 in a transverse direction to the path of the cutting tool 5 as the cutting tool 5 rotates.

When the trailing edge 31 of the cutting tool 5 passes from the processing region 43 as the cutting tool 5 rotates, the cutting tool passes into the recovery region 45, as shown in FIG. 4. Therefore, the resistive force of the unprocessed food stuff received in the processing region 43 acting on the cutting tool 5 is removed. The cutting tool 5 is then free to rotate in the recovery region 45 in the cutting tool receiving space 29 until the cutting edge 35 passes back into the processing region 43. It will be appreciated that the loading of the cutting tool 5, and therefore the drive unit, is determined by the resistive force of the unprocessed food stuff and the radial angle of the processing region 43 as the cutting tool 5 rotates in the processing region 43.

When the loading of the drive unit increases due to the resistive force of the food stuff acting on the cutting tool 5 in the processing region 43 then the rotational speed of the cutting tool 5 and the drive unit decreases as the momentum of the cutting tool 5 is reduced. As the trailing edge 31 of the cutting tool 5 passes from the processing region 43 the resistive force of the unprocessed food stuff in the processing region 43 is removed and so the load acting on the cutting tool 5 and drive unit reduces. Therefore, the rotational speed of the cutting tool 5 is able to recover in the recovery region 45 defined by the path of the cutting tool 5 outside the processing region 43. It will be appreciated that the rotational angle through which the cutting tool 5 passes in the recovery region 45 is sufficient for the cutting tool 5 to recover its rotational speed, so that the cutting edge 35 of the cutting tool 5 has the same rotational speed as it passes into the processing region 43 on each revolution of the cutting tool 5.

In view of the forgoing, it is possible to use a hand blender with a powered motor that produces a low torque to operate an apparatus for processing a food stuff, such as a cube cutting machine.

It will be appreciated that the cutting tool 5 must pass through a significant rotational angle in the recovery region 45 to recover its rotational speed and obtain full momentum. If the cutting tool 5 is only able to pass through a small rotational angle from leaving the processing region 43 before it passes into the processing region 43 again then the cutting tool 5 and drive unit will lose further speed and the load acting on the cutting tool 5 will quickly prevent rotation of the cutting tool 5. For example, it will be appreciated that a cutting tool with a diametrically extending cutting element may pass from the processing region 43, but would pass back into the processing region 43 again after passing through a very small rotational angle and so would not regain its full momentum.

Although in the above exemplary embodiment the apparatus for cutting a food stuff is configured to dice a food stuff into cubes, it will be appreciated that the invention is not limited thereto and that the apparatus may be configured to process a food stuff in an alternative manner, for example by an operation of slicing, chopping, cutting, dicing, crushing or grating.

Although in the above exemplary embodiments the mounting element 30 is a shaft which is received in an upper bore 26 of the upper part 3 and the lower bore 13 of the lower part 4, in an alternative embodiment a shaft is rotatably mounted to the lower part 3 of the housing 2 and a mounting element of the cutting tool has a bore which slides over and engages with the shaft. Therefore, when the shaft is rotated the cutting tool is rotated with the shaft through torque transferred through the mounting element.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. An apparatus for processing a food stuff comprising:
a housing, and
a cutting tool rotatably mounted in the housing, via a central mounting element, about a rotational axis, wherein the cutting tool comprises a single elongate cutting element having a cutting edge that forms a leading edge as the cutting tool is rotated and a trailing edge, parallel to the leading edge, on an opposite edge of the cutting tool, wherein the single elongate cutting element extends radially outward from the central mounting element, wherein the cutting tool further comprises a support element disposed at a distal end of the single elongate cutting element from the central mounting element, wherein the support element comprises an elongate arcuate member that extends perpendicular to the single elongate cutting element, the elongate arcuate member having a length in a circumferential direction on the order of a length in a radial direction of the single elongate cutting element,
the cutting tool being configured to pass once per revolution through a processing region in the housing in which a food stuff is receivable, and to pass through a recovery region in which the cutting tool is free to rotate without contacting the food stuff in the processing region,
wherein the recovery region is defined in the housing between the trailing edge passing from the processing region and the cutting edge passing into the processing region as the cutting tool rotates, so that the cutting tool acts on a food stuff as the cutting tool rotates through the processing region, and recovers a rotational speed lost due to acting on a food stuff in the processing region as the cutting tool rotates through the recovery region.

2. The apparatus according to claim 1, wherein the recovery region is configured to extend about the rotational axis of the cutting tool by an angle which is sufficient for the cutting edge of the cutting tool to pass into the processing region at a same rotational speed on each revolution of the cutting tool.

3. The apparatus according to claim 2, wherein the recovery region is configured to extend about the rotational axis of the cutting tool by an angle of at least 120 degrees.

4. The apparatus according to claim 1, further comprising a circumferentially extending slot formed by the housing, the circumferentially extending slot having interior plain bearing surfaces configured to slideably receive the support element, wherein the support element is configured to slide along the interior plain bearing surfaces of the slot as the cutting tool is rotated in the housing, but prevented from moving in an axial direction.

5. The apparatus according to claim 1, wherein the housing has first and second opposing faces between which the rotational path of the cutting tool is defined.

6. The apparatus according to claim 5, wherein an opening is defined in the first opposing face through which a food stuff is feedable into the processing region.

7. The apparatus according to claim 6, wherein the processing region is defined between the second opposing face and the opening in the first opposing face.

8. The apparatus according to claim 7, wherein a cutting die is received in the second opposing face.

9. The apparatus according to claim 8, wherein the area of the cutting die is configured to encompass the processing region in an axial direction.

10. A food processor comprising an apparatus for processing a food stuff according to claim 1.

11. The food processor according to claim 10, further comprising a drive unit, wherein the drive unit is a handblender.

12. A method of processing a food stuff in an apparatus for processing a food stuff comprising a housing, and a cutting tool rotatably mounted in the housing, via a central mounting element, about a rotational axis, wherein the cutting tool comprises a single elongate cutting element having a cutting edge that forms a leading edge as the cutting tool is rotated and a trailing edge, parallel to the leading edge, on an opposite edge of the cutting tool, wherein the single elongate cutting element extends radially outward from the central mounting element, wherein the cutting tool further comprises a support element disposed at a distal end of the single elongate cutting element from the central mounting element, wherein the support element comprises an elongate arcuate member that extends perpendicular to the single elongate cutting element, the elongate arcuate member having a length in a circumferential direction on the order of a length in a radial direction of the single elongate cutting element, the cutting tool passing once per revolution through a processing region in the housing in which a food stuff is receivable, and passing through a recovery region in which the cutting tool is free to rotate without contacting the food stuff in the processing region, wherein the recovery region is defined in the housing between the trailing edge passing from the processing region and the cutting edge passing into the processing region as the cutting tool rotates, so that the cutting tool acts on a food stuff as the cutting tool rotates through the processing region and recovers a rotational speed lost due to acting on a food stuff in the processing region as the cutting tool rotates through the recovery region.

13. The method of claim 12, wherein the apparatus for processing the food stuff further comprises a circumferentially extending slot formed by the housing, the circumferentially extending slot having interior plain bearing surfaces configured to slideably receive the support element, wherein the support element is configured to slide along the interior plain bearing surfaces of the slot as the cutting tool is rotated in the housing, but prevented from moving in an axial direction.

* * * * *